A. E. ANDERSON.
MILKING APPARATUS.
APPLICATION FILED MAR. 28, 1916.
1,226,842.
Patented May 22, 1917.
4 SHEETS—SHEET 1.
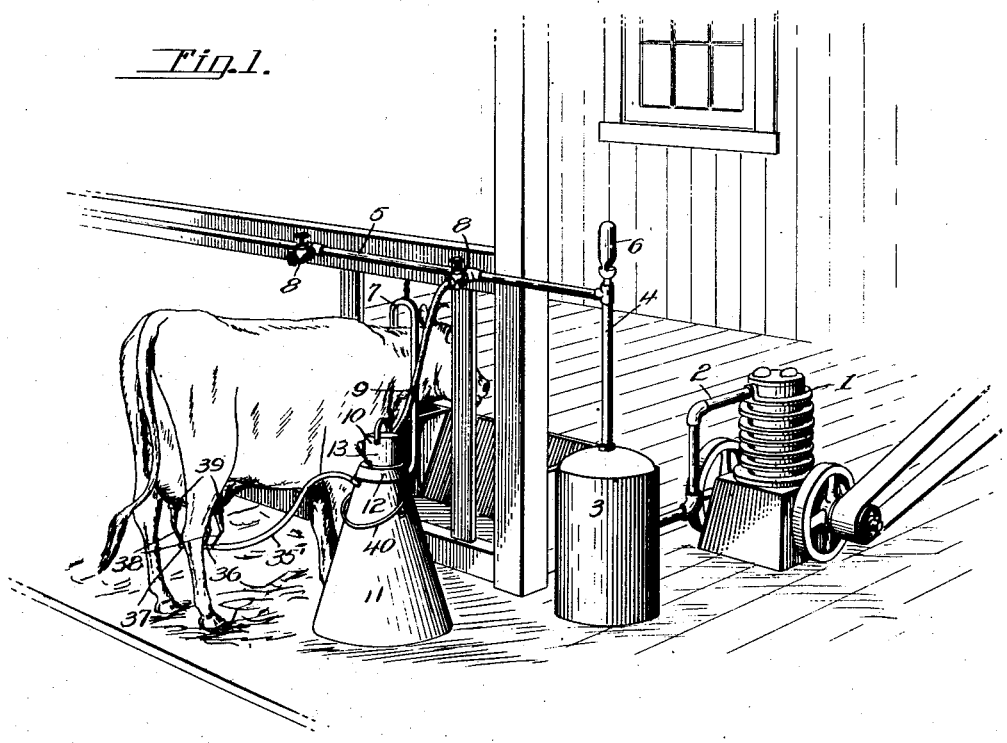
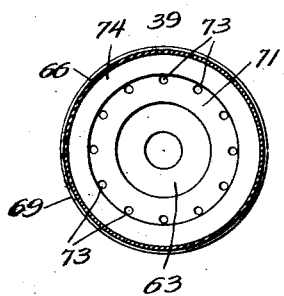
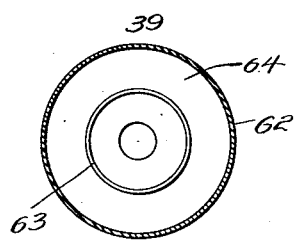
Inventor
Austin E. Anderson.
Witnesses
By Victor J. Evans
Attorney

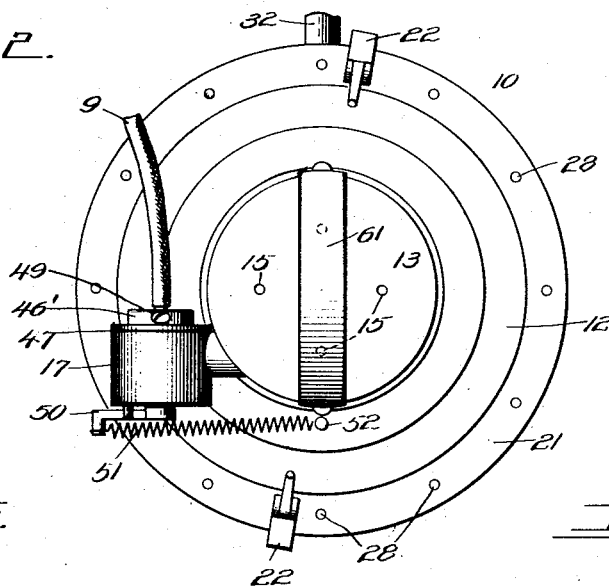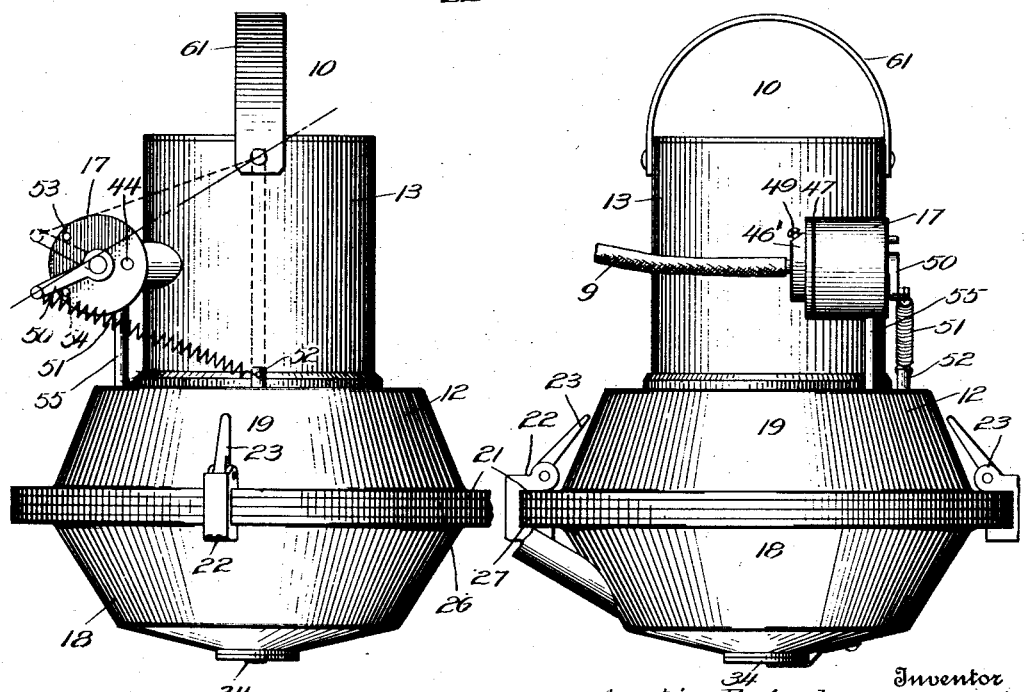

A. E. ANDERSON.
MILKING APPARATUS.
APPLICATION FILED MAR. 28, 1916.
1,226,842.
Patented May 22, 1917.
4 SHEETS—SHEET 3.
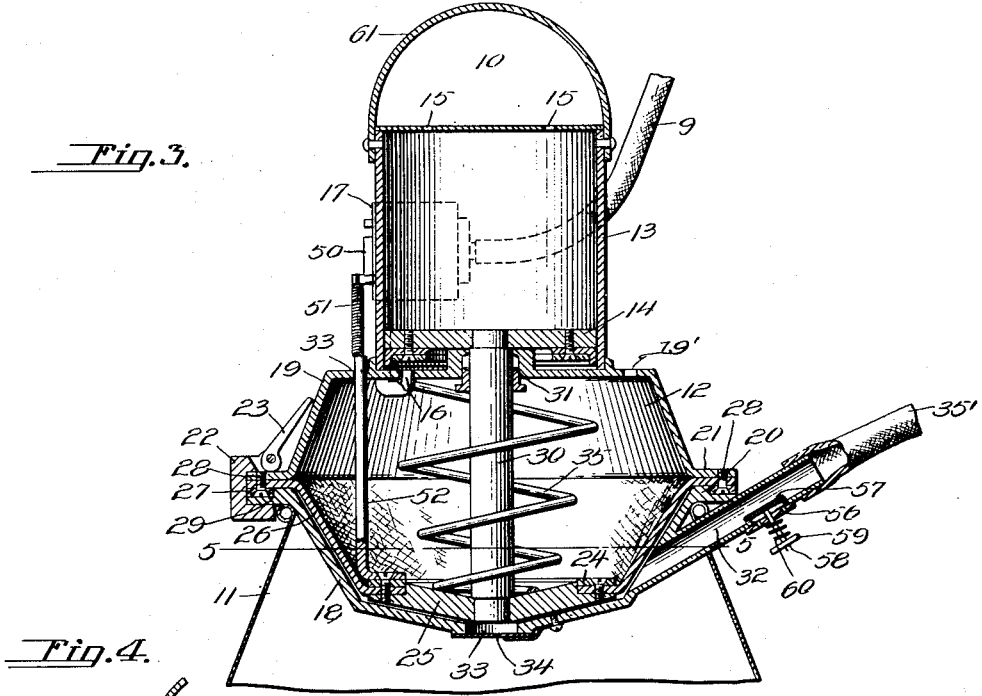
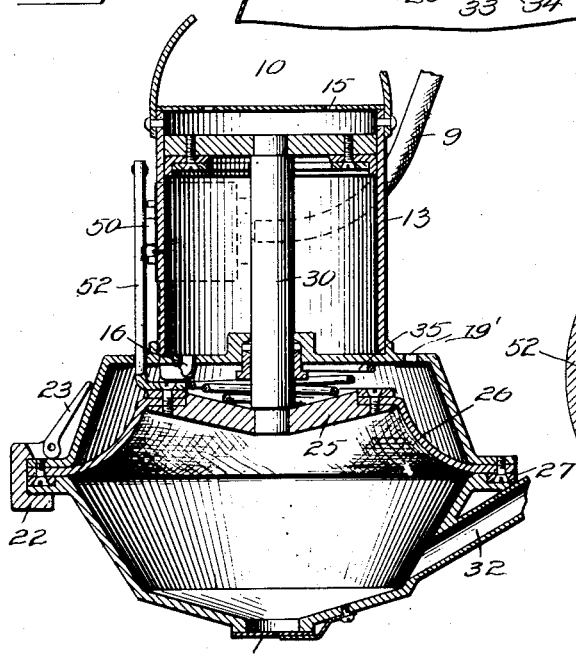
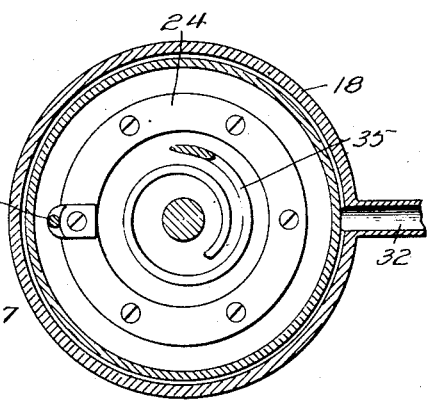
Inventor
Austin E. Anderson.
Witnesses
By Victor J. Evans
Attorney

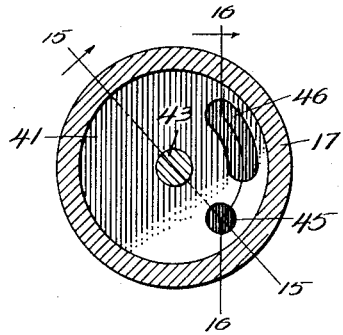
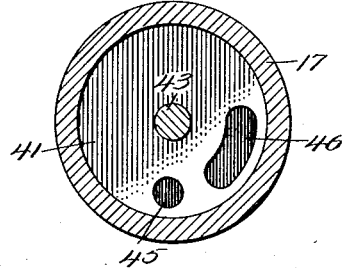
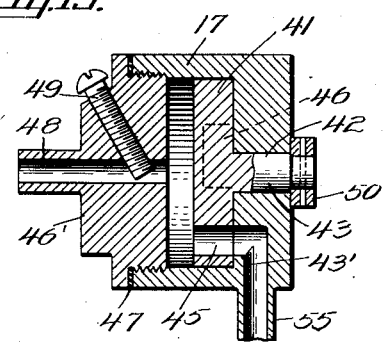
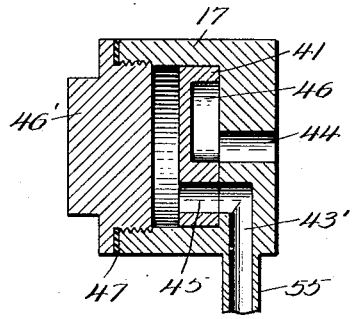
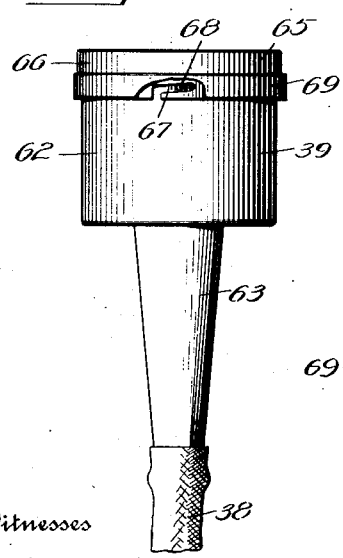
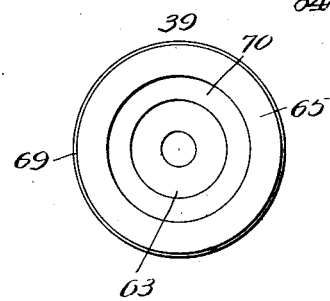
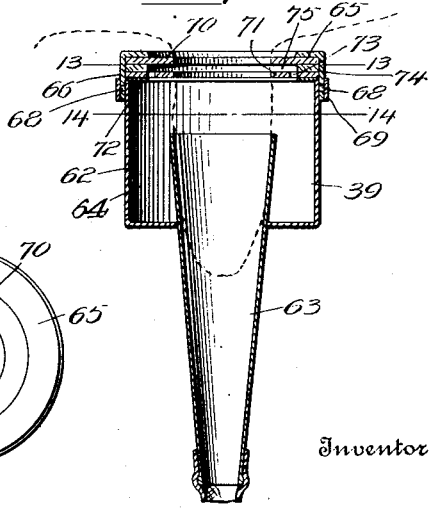

UNITED STATES PATENT OFFICE.

AUSTIN E. ANDERSON, OF EAST RANDOLPH, NEW YORK.

MILKING APPARATUS.

1,226,842.     Specification of Letters Patent.     Patented May 22, 1917.

Application filed March 28, 1916. Serial No. 87,248.

*To all whom it may concern:*

Be it known that I, AUSTIN E. ANDERSON, a citizen of the United States, residing at East Randolph, in the county of Cattaraugus and State of New York, have invented new and useful Improvements in Milking Apparatus, of which the following is a specification.

This invention relates to certain new and useful improvements in milking apparatus of the vacuum type, and particularly to improvements in the vacuum producing means, whereby greater efficiency of operation is secured, together with a higher degree of sanitary action.

In milking apparatus of the general type employing the suction or vacuum system of extraction it has been customary to provide a general vacuum system, composed of an arrangement of piping connected with an air exhaust pump, and to connect the teat cups or extractors directly with such vacuum pipes, whereby the milk is extracted and discharged into suitable receiving vessels. The objection to this type of apparatus resides not only in the necessarily large size of the piping and vacuum pump, making the apparatus comparatively costly, but also because of the fact that the vapor rising from the warm milk carries with it some animal matter which is deposited within the piping and contaminates the same, necessitating frequent cleaning.

One object of my invention is to provide a milking apparatus which obviates this objection by providing a suction producing device or pump for each separate operation, and which is readily transportable from place to place to be used as desired, which suction producing device or pump is adapted to be operated by compressed air from a compressed air supply system, but, so far as its vacuum side is concerned, is entirely separate from the piping, so that the pipes are prevented from becoming contaminated with matter from the milk, while pipes and a compressor pump of comparatively small size and which may be installed at comparatively low expense may be employed.

A further object of the invention is to provide a vacuum forming device or pump of the character described, which includes vacuum and compressed air pistons, the former operated from the latter for the vacuum producing action, and the compressed air piston being operated by air from the compressed air system in at least one direction to operate said vacuum producing piston.

A still further object of the invention is to provide a compressed air operated pump which is complete in itself and may be connected as desired with any portion of the compressed air supply system, and which is adapted to be supported on and to form a cover for the milk receiving pail or vessel in connection with which it is used.

A still further object of the invention is to provide means for producing a pulsating or more or less irregular vacuum action to obviate the objections arising from vacuum actions which are continuous and of generally increasing intensity.

A still further object of the invention is to provide novel valve mechanism for controlling the air supplied to the air cylinder and piston and the exhaust of air therefrom.

A still further object of the invention is to provide novel construction of teat cup having a vacuum holding action by means of which the objections to constant vacuum or mechanically contractile grip teat cups are avoided.

With these and other objects in view, the invention consists of the features of construction, combination and arrangement of parts hereinafter fully described and claimed, reference being had to the accompanying drawings in which:—

Figure 1 is a perspective view showing the essential elements of a milking apparatus embodying my invention.

Fig. 2 is a top plan view of the suction pump and milk receptacle.

Fig. 3 is a vertical section through the suction pump and upper portion of the milk receptacle, showing the pistons retracted.

Fig. 4 is a view similar to Fig. 3 showing the pistons at the limit of their working stroke for the vacuum producing action.

Fig. 5 is a detail section on the line 5—5 of Fig. 3.

Figs. 6 and 7 are side elevations showing particularly the valve and valve operating mechanism, with the parts in the positions they assume in reverse positions of the valve.

Figs. 8 and 9 are sections through the valve showing the same in its reverse positions.

Fig. 10 is a side elevation of one of the teat cups.

Fig. 11 is a top plan view thereof.

Fig. 12 is a vertical section through the teat cup.

Figs. 13 and 14 are horizontal transverse sections through the teat cups on the line 13—13 and 14—14 of Fig. 12.

Figs. 15 and 16 are sections through the valve taken, respectively, on the lines 15—15 and 16—16 of Fig. 8.

In carrying my invention into practice, I provide a compressor 1 for supplying air under a predetermined pressure through a pipe 2 to a tank or reservoir 3, in which a sufficient amount of the compressed air may be stored to prevent undue fluctuations of pressure in the pipe system. A feed pipe 4 is provided for conducting the compressed air from the tank or reservoir to a distributing pipe 5, which may extend to the different stalls or milking stanchions within the stable or other building in which the work is carried out. Safety valves 6, of which one is shown, may be provided wherever desired to permit of the escape of excess air pressure to the atmosphere. At a point adjacent to each milking stall or stanchion, where a yoke or other fastening 7 is provided for securing the animal, a valved connection 8 is arranged for the attachment of a delivery pipe or tube 9 leading to the milking device proper, which pipe or tube is preferably an ordinary hose tube or other suitable flexible pipe.

The pipe 9 is provided to supply compressed air to the operating cylinder and piston of a suction device or pump 10 which is used in conjunction with and preferably employed as a cover or closure for the top of a milk can or receptacle 11. This pump includes a lower pump casing or chamber 12, and an upper power chamber or cylinder 13, in which latter operates a piston 14, which reciprocates in fluid-tight engagement with the cylinder, which is provided at its top with one or more air inlet and exhaust openings 15 connecting the upper portion of the cylinder with the atmosphere and at its bottom with an air inlet and exhaust opening 16 connecting the lower portion of the cylinder with an air chest or admission valve casing 17 whereby air under pressure is supplied from the pipe 9, connected with said casing, as hereinafter fully described.

The pump casing 12 is preferably horizontally divided to form a bottom section 18 and a top section 19, the latter having one or more air inlet and exhaust openings 19' serving the same function as the openings 15, which sections 18 and 19 are provided with outwardly extending flanges 20 and 21, respectively, adapted to be engaged by clips 22 having cam lever clamps 23, by means of which the clips are detachably held in position to clamp the flanges 20 and 21 together and thus hold the sections of the chamber 12 firmly connected. This mode of fastening the parts described together permits of the ready and convenient assemblage and disassemblage of the parts, as well as the ready removal of the lower portion of the chamber 12, containing parts which come directly in contact with the milk, so that such parts may be cleansed to keep the apparatus in an absolutely sterile and sanitary condition.

Arranged within the casing 12 and separating the two chambers 18 and 19 is a vertically movable piston or diaphragm 24 comprising a central metallic section 25 and a body portion 26 of rubber or other suitable strong and durable, preferably elastic, fabric, the edges of which fabric are clamped against the underside of the flange 21 of the casing section 19 by a clamping ring 27 secured in position by screws 28, said ring being arranged to fit within a receiving recess 29 in the flange 20, so that the portion of the fabric secured to the flange 21 will be clamped between such flanges and thereby firmly held and at the same time will form a fluid-tight gasket sealing the casing against the admission or exhaust of air except as hereinafter described.

The compressed air piston 14 working in the power chamber 13 is coupled to the section 25 of the piston 24 by a stem 30, working through a stuffing box 31 in the top of the upper section of the casing 12, which also forms the bottom of the cylinder 13, whereby the said upper piston 14 and the lower piston or diaphragm 24 are connected for movement in unison, and the arrangement being such that the diaphragm 24 is adapted to separate the casing 12 into upper and lower compartments, the lower compartment serving as a vacuum and milk feed chamber or compartment whereby the milk will be extracted through the medium of the extracting devices, hereinafter referred to, and discharged into the receptacle 11, and the lower compartment serving as a working chamber in which the diaphragm is movable for suction producing actions. In the operation of the two pistons, the piston 14 is forced upwardly by air pressure and carries with it the piston or diaphragm 24, which is thus caused to form a partial vacuum in the vacuum chamber or compartment 18 of the casing 12 between the said piston or diaphragm 24 and the walls of said casing section 18, which casing section is closed against communication with the exterior except through a milk inlet tube 32 extending into one side thereof and a milk outlet or discharge port or opening 33 disposed at the depressed center thereof and normally closed by a spring compressed flap valve 34, a coiled retracting spring 35 being provided about the stem 30 between the diaphragm and upper wall of the section 19 of chamber 12 for moving the pistons downward or returning them, after actuation, to normal position. The tube 32 is connected in practice with one end of a suction hose or pipe 35', extending from and connected at its opposite end with the outlet tube 36 of a header or manifold 37 of a teat cup support which is provided with suction tubes 38 for connection with the teat cups 39. It will be understood from the foregoing description that the suction pump may be connected with and disconnected from the receptacle 11 at will, and may accordingly be attached to different receptacles. Each receptacle 11 is preferably provided with a handle 40 whereby it may be conveniently carried from place to place as desired.

Valve mechanism is provided for controlling the supply of compressed air through the pipe 9 to the cylinder 13 and the exhaust of the spent air from said cylinder to the atmosphere. This valve mechanism comprises an oscillatory valve member 41 arranged within the chest or casing 17, which chest or casing is provided at one side with an opening 42 for the passing of the valve stem 43, and is also provided with air inlet and exhaust openings 43' and 44, for coöperation with an air inlet opening 45 and an air exhaust groove or recess 46 in the valve. At its opposite side the valve casing is normally open and closed by a threaded plug 46' between which and the wall of the casing is interposed a gasket 47 to make a fluid-tight joint. This plug is provided with an air feed port 48 connected with the pipe 9, and fitted at an angle in the plug is a screw 49 which projects into the port 48 and is adapted to be adjusted inwardly or outwardly to vary the effective size of the port to obstruct it to a greater or less degree to vary the feed of air to the air pressure cylinder, by means of which the degree of rapidity of the vacuum producing pulsations may be varied as desired.

The valve stem 43 is provided with a crank arm 50 which is connected by a coiled contractile spring 51 or any equivalent elastic connection with a controlling or actuating, as well as timing, rod 52 which is movable through a guide opening 53 in the top of the casing 13 and is connected with the rigid portion of the piston or diaphragm 24 for operation thereby. The valve actuating arm 50 is movable between stops 53 and 54 on the valve casing, which define the limits of the opening and closing movements of the valve to bring the port 43' thereof respectively into connection with the port 45 or into connection through the groove 46 with the port 44 for admission and exhaust actions, the port 43' being connected through a tube or duct 55 with the port 16, through which tube the admission and exhaust of air to and from the cylinder 13 is effected. The rod 52 moves upwardly and downwardly with the diaphragm 24 and during the greater portion of its range of motion in each direction simply takes up the lost-motion between the rod and the crank arm 50 due to the provision of the intervening connection or spring 51 and until such spring is elongated and tensioned to a predetermined degree, when the valve will be quickly, practically instantaneously, moved from one position to another so as to effect the rapid admission or exhaust of air, the valve thus remaining in one position until near the ends of the strokes of the piston after it is shifted to the opposite position, as will be readily understood. It will be observed that through the operation just described an automatic admission and cut-off action of the valve will be obtained, and that while the piston 14 is on its working stroke its motion instead of being regular and continuous will be, while progressive, to some extent irregular or spasmodic, due to the resistance of the flexible diaphragm and the variable resistance of the retraction spring 35 while being tensioned, and the comparatively small size of the feed ports, whereby a variable or fluctuating degree of suction or vacuum will be produced in the vacuum chamber 12. As a result of this operation, a more natural and efficient suction action for extraction is obtained (one closely simulating hand milking) than is possible where the suction is continuous and substantially of full and equal force throughout, and by varying the suction pull between reasonable limits the high tension and tendency to injury of the parts of the udder liable under a continuous or constant full vacuum pull is avoided and a positive and reliable and yet easy extracting action secured. This easy extracting action is also rendered efficient by reason of the fact that the vacuum pull is intermittent, instead of continuous, the diaphragm 24 acting only on its upward movement to form a partial vacuum in the vacuum chamber 18 of the chamber 12 and on its downward movement serving simply to discharge the milk flowing into the vacuum chamber through the passage 33 into the receptacle 11, and to let air back into the milk feed line to relieve the vacuum on the base of the teats, leaving just sufficient vacuum in the top of the teat cups for a gentle adhesive action. The valve 34 opens under very light pressure and gravity of milk from above to allow the milk to pass into the receptacle and then closes automatically, as will be readily understood. Formed in the inlet tube 32 are air relief openings 56 controlled by a valve 57 having an outwardly projecting stem 58 threaded to receive an adjustable disk or nut 59, and between which and the wall of the tube is interposed a coiled resistance spring 60, whose tension or resistance may be varied by adjusting said nut. This valve normally closes the openings, 56, but in case that the degree of vacuum or suction produced within the suction casing should be too great the valve 57 will be pulled upon to admit a certain amount of air by means of which the vacuum will be broken or reduced to prevent injury to the animal, as will be readily understood. A handle 61 is supplied to the cylinder 13, by means of which the suction device as a whole may be readily and conveniently handled or transported from point to point.

Each teat cup 39 is of novel construction and comprises a cup proper 62 which receives the upper enlarged end of a conical extraction tube 63, connected at its reduced end with the pipe 38, and which enlarged end of the tube receives the outer end of the teat. The tube 63 is rigid with respect to the cup proper and extends a part way thereinto, the space between the walls of the cup and tube providing a vacuum chamber 64. The upper end of the cup is adapted to be partly closed by a closure member consisting of a cap ring 65 having a depending flange 66 to fit about the upper portion of the cup and provided with inclined or cam slots 67 to receive pins or studs 68 projecting from the cup, by means of which the ring will be fastened in position and at the same time drawn down upon the cup for a sealing action, as hereinafter described. The flange 66 is preferably provided with a reinforcing ring 69, soldered, brazed or otherwise united thereto.

Arranged within the cap ring are sealing members comprising an upper washer 70 which is arranged to directly underlie the ring body, and this disk or washer is spaced from a similar disk or washer 71 which is disposed beneath the same and bears against an underlying metallic disk or washer 72 which rests against the rim edge of the cup 62. The washer 71 is formed therein with air openings 73, and the outer portion of this washer 71 is separated from the washer 70 by a spacing ring or disk 74, which is of less width than the disks 70 and 71, so as to provide an annular vacuum space 75 which is in communication with the openings 73 and opens into the space bounded by the group of sealing disks or rings and through which the teat extends into the cup and extraction tube. When the cup is applied in position for use, the sealing disks bear upon the neck portion of the teat with a very light pressure, and a sufficient vacuum exists in the chamber 64, owing to the fact that said chamber is in communication with the vacuum space of the vacuum pump, to draw the air from the vacuum space 75 through the opening 73 so that the walls of the teat will be drawn snugly into engagement with the sealing disks, thus maintaining the cup in position without any material amount of pressure. By this means a construction of cup is provided which, unlike the mechanically held cups in common use, is not open to the objection of clamping and compressing the teat and retarding the flow of milk or blood or otherwise causing injury to the udder or teats.

From the foregoing description, taken in connection with the drawings, the construction and mode of operation of my improved milking apparatus will be readily understood, and it will be seen that the invention provides a device of this character which is simple of construction, reliable and efficient in operation, and which overcomes the objections noted to prior devices and at the same time secures the objects sought in a reliable and efficient manner.

I claim:—

1. In a milking apparatus, a suction device comprising a casing, a diaphragm separating said casing into suction and working chambers, milk inlet and outlet connections communicating solely with said suction chamber, and means associated with the working chamber for actuating the diaphragm for forming a vacuum in said suction chamber.

2. In a milking apparatus, a source of compressed air supply, a pump chamber, a movable diaphragm separating said chamber into non-communicating suction and working sides, the suction side forming a milk conduit having inlet and outlet passages, and means on the working side coöperating with the source of compressed air supply for actuating said diaphragm.

3. In a milking apparatus, a pump chamber, a diaphragm separating the same into non-communicating suction and working sides, said suction side having a milk inlet and a milk discharge outlet, spring means for imparting motion to the diaphragm in one direction, and compressed air means for applying motion to the diaphragm in the opposite direction.

4. In a milking apparatus, a pump casing, a diaphragm separating the same into non-communicating suction and working sides, the suction side having a milk inlet and a milk outlet, means for actuating said diaphragm, and automatic means for connecting the suction side with the atmosphere upon the formation of an excessive degree of vacuum therein.

5. In a milking apparatus a pump casing, a diaphragm separating the same into non-communicating suction and working sides, the suction side having a milk inlet and a milk outlet, means on the working side for actuating the diaphragm, and a suction valve controlling said milk outlet.

6. In a milking apparatus, a pump casing, a diaphragm separating said casing into non-communicating suction and working sides, said suction side having a milk inlet and a milk outlet, an automatic air relief valve communicating through said milk inlet with said suction side, and means on the working side for actuating the diaphragm.

7. In a milking apparatus, a pump casing, a diaphragm separating the same into suction and working sides, said suction side having a milk inlet and a milk outlet, valve controlled fluid pressure means for imparting motion to the diaphragm in one direction, spring means for imparting motion to the diaphragm in the opposite direction, and means controlled by the movements of the diaphragm for automatically governing said valve.

8. In a milking apparatus, pump casing composed of sections, means for detachably connecting said sections, a diaphragm secured to one of the sections and adapted to be clamped between the sections, said diaphragm separating said sections respectively into non-communicating working and vacuum chambers, said vacuum chamber having a milk inlet and a milk outlet, a spring in the working chamber between the diaphragm and a wall of said chamber for moving the diaphragm in one direction, compressed air operated means for moving the diaphragm in the opposite direction, and a valve controlling the supply of compressed air and automatically governed by the movements of the diaphragm.

9. In a milking apparatus, a teat cup having a vacuum chamber, and a sealing means adapted to surround the teat and comprising a pair of superposed flexible disks having registering openings for the passage of the teat and disposed in spaced relation to provide a vacuum space communicating with said openings, the lower disk being provided with perforations establishing communication between said space and the vacuum chamber.

10. In a milking apparatus, a teat cup having a vacuum chamber in communication with the vacuum producing means of the system, and a sealing gasket adapted to surround the teat and having vacuum space in communication with said vacuum chamber.

11. In a milking apparatus, a pump comprising a pump casing provided with suction, working and power chambers, a movable diaphragm separating said suction and working chambers, milk feed connections communicating with the suction chamber, a fluid pressure piston operating in the power chamber and connected with said diaphragm for operating the same on its suction motion, and means inclosed within the working chamber for forcing the diaphragm on its return motion into the suction chamber to expel the contents thereof.

12. In a milking apparatus, a suction device having a suction chamber, a movable element for forming a suction therein, compressed air means entirely independent of communication with the suction chamber for imparting working motion to said movable element for forming a suction in said chamber, and milk supply and discharge connections associated with the suction chamber.

13. In a milking apparatus, teat engaging means, means for creating suction in said means, a fluid operated motor for operating the second means, and means under control of the latter for governing the admission of fluid to the motor.

14. In a milking apparatus, teat engaging means, a fluid operated motor, a vacuum producer connected with the teat engaging means and operable by the motor, and resilient means for resisting the action of the fluid operated motor to effect an irregular operation of the vacuum producer.

15. In a milking apparatus, teat engaging means, a fluid operated motor, a vacuum chamber connected with the teat engaging means, means movable in the chamber to create a vacuum therein and operable by the motor in one direction, means arranged to operate the last means in the opposite direction, and a valve mechanism under control of the last means for admitting fluid pressure to the motor.

16. In a milking apparatus, in combination with teat engaging means, means to create a vacuum in said means, and fluid pressure means including a variable resistance element for actuating said vacuum creating means.

17. In a milking apparatus in combination with teat engaging means, a pump for creating a vacuum in said means, fluid pressure means for actuating the pump, means controlled by the pump for admitting and excluding the fluid into and from said fluid pressure means.

18. In a milking apparatus, in combination with teat engaging means, vacuum producing means connected thereto, fluid operated means for actuating said vacuum producing means to create a vacuum in said engaging means, and means for opposing a positive variable resistance to the action of said vacuum producing means for controlling the action of said vacuum producing means for varying the degrees of suction action during the vacuum producing operation.

In testimony whereof I affix my signature in presence of two witnesses.

AUSTIN E. ANDERSON.

Witnesses:
P. A. ANDERSON,
CLARENCE W. ANDERSON.